United States Patent [19]
Gasiorowski et al.

[11] Patent Number: 6,077,494
[45] Date of Patent: Jun. 20, 2000

[54] METHOD FOR REMOVING AMMONIA FROM AMMONIA CONTAMINATED FLY ASH

[75] Inventors: Stephen A. Gasiorowski, Berlin; Frank J. Hrach, Jr., Mansfield, both of Mass.

[73] Assignee: Separation Technologies, Inc., Needham, Mass.

[21] Appl. No.: 09/256,128

[22] Filed: Feb. 24, 1999

[51] Int. Cl.[7] .............................. C01C 3/00; C01F 15/00; C01G 43/00; C01G 43/08

[52] U.S. Cl. .................. 423/357; 423/237; 423/238; 423/352; 423/356

[58] Field of Search ...................... 423/237, 238, 423/352, 356, 357; 71/11

[56] References Cited

U.S. PATENT DOCUMENTS

| | | | |
|---|---|---|---|
| 5,069,720 | 12/1991 | Epperly et al. | 106/287.35 |
| 5,211,926 | 5/1993 | Martin et al. | 423/237 |

FOREIGN PATENT DOCUMENTS

| | | | |
|---|---|---|---|
| 492539-A1 | 12/1991 | European Pat. Off. | 423/237 |
| 357019078 | 2/1982 | Japan . | |
| 08187484 | 7/1996 | Japan | B09B 3/00 |
| 10146576 | 11/1996 | Japan | B09B 3/00 |

OTHER PUBLICATIONS

Van der Brugghen, F.W., Gast, C.H., Van den Berg, J.W., Kuiper, W.H., Visser, R., *Problems Encountered During the Use of Ammonium–Contaminated Fly Ash*, Proceedings: EPRI/EPA 1995 Joint Symposium on Stationary Combustion No$_x$ Control, May 16–19, 1995, Book 4, Session 8A.

Fisher, B. C., Blackstock, T., and Hauke, D., *Fly Ash Beneficiation Using an Ammonia Stripping Process*, Proceedings: 12th Int. Symposium on Coal Combustion By–Products Management and Use, Jan. 1997, Paper #65.

Larrimore, Lamar, Dodgen, Dean, and Monroe, Larry, *Characterization of Ammonia Effects on Ash and Evaluation of Removal Methods*, Proceedings: 13th International Symposium on Use and Management of Combustion Products, Jan. 1999, Paper #16.

Van den Berg, J.W., and Cornelissen, H.A.W., *Effect of low Nox technologies on Fly Ash Quality*, Proceedings: 13th Int. Symposium on Coal Combustion By–Products Management and Use, Jan. 1999, Paper #29.

*Primary Examiner*—Steven P. Griffin
*Assistant Examiner*—Maribel Medina
*Attorney, Agent, or Firm*—Wolf, Greenfield & Sacks, P.C.

[57] ABSTRACT

A method for removing ammonia from coal fly ash contaminated by ammonium salts is disclosed. The method involves the addition of small amounts of water, and in some cases, small amounts of an alkali source, to the fly ash to liberate the ammonia trapped therein. The ammonia liberation may be further aided by vigorous mixing of the fly ash.

17 Claims, 4 Drawing Sheets

METHOD FOR REMOVING AMMONIA FROM AMMONIA CONTAMINATED FLY ASH

BACKGROUND OF THE INVENTION

The relationship between the environment and human activities is becoming better understood. While humans have always depended on the environment for their air, water, and food, only recently have the impact of human activities on the environment become apparent. Modern civilization produces industrial by-products of types and amounts that degrade the environment. Currently, pollution control regulations and technologies are seeking to mitigate these effects.

An important industrial by-product is fly ash. Worldwide, tremendous quantities of coal are burned to generate electricity. Typically, coal is pulverized to a fine powder, pneumatically conveyed into a boiler and burned as a dispersed powder with the heat which is liberated being used to produce steam to power turbines and generate electricity. In the boiler, the carbonaceous constituents in the coal burn and release heat. The non-combustible materials are heated to high temperatures and typically melt and pass through and out of the boiler as fly ash. This fly ash is collected prior to the flue gases going up the stack and being dispersed in the atmosphere. A 1,000 megawatt power plant burns approximately 500 tons of coal per hour. Ash levels in the range of 10% are typical of many coals burned throughout the world. As a result, fly ash is produced at very high volumes throughout the industrialized world.

The economic design of any power plant is necessarily a compromise between capital and operating cost. A factor that has become important in recent years is the air pollution produced by burning coal in large utility power plants. NOx is formed by oxygen and nitrogen reacting at high temperatures. Because NOx formation is favored by high temperatures, one way to reduce NOx emissions is to reduce the temperature in the boiler and reduce excess oxygen. This is typically done through utilizing what are called Low NOx Burners. Many boiler manufacturers produce such Low NOx Burners and many utilities are in the process of installing such devices. An undesired side effect of reducing flame temperature and excess oxygen is an increase in the unburned carbon in the fly ash leaving the boiler.

Another way to reduce NOx emissions is to inject ammonia. This results in selective reactions that reduce the levels of NOx present. The capital cost of ammonia injection is small, and its effects are to some extent additive to those achieved by Low NOx Burners. As a result, many utilities have, and many more will, utilize the injection of ammonia, resulting in ammonia contamination of great volumes of fly ash.

Fly ash can be a useful commodity. The passage of non-combustible minerals present in the coal through the high temperature boiler, followed by quenching in the boiler tube changes the relatively inert clay and shale minerals into glassy ceramic type materials. These glassy inorganic particles react with lime to form cementitious materials. This- "pozzolanic" property of fly ash is widely exploited. Fly ash is incorporated into concrete as a substitute for, or addition to, cement where it reacts with free lime liberated during the normal hydration of the cement and produces further property enhancing cementitious materials. Fly ash used in this way produces stronger concrete which is more resistant to environmental attack, resulting in cheaper, higher quality concrete. This valuable use of fly ash as a pozzolan in concrete turns a high volume waste into a high volume useable material.

A further value of using fly ash as a replacement for cement relates to the environmental impact of producing cement. Cement is produced from minerals which are sources of calcium, alumina, and silica. When cement is produced, these minerals are combined in a cement kiln and heated to incipient fusion. For every ton of cement produced, approximately two tons of minerals are mined and approximately one ton of carbon dioxide ($CO_2$) is emitted into the atmosphere from combustion of required fuels and decomposition of limestone. Replacing cement with fly ash reduces $CO_2$ emissions on a ton for ton basis.

The use of fly ash in concrete requires that the fly ash have specific physical and chemical properties. The pozzolanic properties are activated in the concrete by the generation of highly alkaline free lime from hydration of the cement. When fly ash contains ammonia, this ammonia is liberated by the action of the highly alkaline solution of the curing concrete. Ammonia is a strong smelling compound that carries the connotation of barnyards, manure and urine. Thus, though the finished properties of the concrete are not adversely affected, the odor is unacceptable to the concrete producer, the contractor working with the concrete and the ultimate concrete user, particularly if the concrete is used in underground or enclosed spaces. See, for example, Van der Brugghen, F. W., Gast, C. H., Van den Berg, J. W., Kuiper, W. H., Visser, R., *Problems encountered During the Use of ammonium contaminated Fly Ash.*

Fly ash containing less than 100 mg ammonia per kilogram of ash (100 parts per million (ppm)) produces little or no odor when used in the production of concrete. However, the addition of ammonia at the power generation plant typically results in fly ash ammonia contents of 200 to 2500 ppm, rendering the fly ash unacceptable for use in concrete. Thus, reducing air quality problems by controlling the air emissions of power plants increases a solid waste disposal problem and increases $CO_2$ greenhouse emissions from concrete production. Removal of ammonia from fly ash such that the fly ash can be used in concrete would benefit the utility by avoiding solid waste disposal, the concrete producer by lowering the cost of materials and increasing product quality, and the environment by reduction of emissions of greenhouse gases.

As ammonia use by utilities has increased, processes have been suggested to remove ammonia from fly ash. These processes range from heating the ash and driving off the ammonia by thermally decomposing the ammonium salts present, to chemical treatment of the ammonium salts to release ammonia gas. A thermal decomposition process is described by Fisher, Blackstock, and Hauke in *Fly ash benefication using an ammonia stripping process.* $12^{th}$ Int. Symposium on Coal Combustion By-Products Management and Use, January 1997, 65-1 to 65-8. Thermal decomposition requires substantial energy use since the decomposition temperature of the most probable ammonium salts present, ammonium sulfate and ammonium bisulfate, are 808° F. and 813° F. respectively. The energy needed to reach and maintain these ash temperatures, and process equipment required to flush the ammonia gas from the mass of the ash, separate the ash from the ammonia gas, and cool the ash, make this an expensive option.

Chemical treatment of the fly ash to decompose the ammonium salts to ammonia gas takes advantage of the same chemical processes by which ammonia gas is released when ash containing ammonia is used in concrete production. Perhaps the most developed and the most conventional process is described in a European Patent No. 0135148 ('148) to Huller, Wirsching, and Hamm. In the process disclosed in the '148 patent, the ammonia containing fly ash is mixed with lime and water and the mixture is allowed to sit for ½ to 2 hours while ammonia is evolved. This process calls for particular attention to be paid to not allowing the temperature of the ash-lime-water mixture to fall below 100° C. Temperature control is achieved by controlling the amount of lime added and ratio of lime to water, so that the heat of hydration of the lime is sufficient to evaporate all of the water added and maintain the temperature of the mixture mass above 100° C. This results in a free flowing ash containing less than 10 ppm ammonia.

The process of the '148 patent, while producing an ash of acceptably low ammonia content, presents a number of difficulties. The time for the reaction is inconveniently long, necessitating large equipment. The quantity of lime required, from 5 to 30% of the mass of the fly ash, is quite high and will change the resulting usefulness of the ash in concrete. By present ASTM specifications covering fly ash for use in concrete (ASTM C618-97), the sum of the alumina+silica+iron content must be 70% or greater for Class F fly ash and 50% or greater for Class C fly ash. Addition of lime at the levels suggested in this process would frequently result in a Class F ash to be reclassified as a Class C ash and a Class C ash to no longer meet the minimum requirements for use in concrete. The presence of substantial quantities of free lime in the processed fly ash would also change its behavior in concrete, decreasing its usefulness. Thus for economic factors and changes in the chemistry of the resulting ash, this process appears unsuitable for reducing the ammonia content of fly ash to be used in concrete.

U.S. Pat. No. 5,069,720 ('720) to Epperly and Sprague describes a process by which the emission of ammonia from ammoniated fly ash can be reduced by, among other processes, treatment of fly ash with lime and water. The described processes are directed to forming a physical barrier to the flow of water to the fly ash and the flow of gaseous ammonia from the fly ash. Relatively large quantities of lime are again used: 10% by mass of the ash. In particular, the described process of the '720 patent is for treating the fly ash for disposal purposes, and for preventing ammonia from being emitted to the air, rather than aiding in removal from the ash. The use of lime is rejected as being less effective than the other compositions disclosed in the patent.

U.S. Pat. No. 5,211,926 ('926) to Martin, et al. describes a process for rendering ammonia contaminated fly ash usable in concrete or other applications. The process described uses large amounts of water, in the range of 25 to 40%. The water is mixed with the ash in batches and the resulting ammonia drawn off by vacuum. Adjustment of the material pH to greater than 10 is identified as particularly effective. No specific means to accomplish this pH adjustment is given. However, a large majority of the water must be removed to produce a marketable product; since the ASTM specifications require a maximum water content of 3%.

SUMMARY OF THE INVENTION

Accordingly, the present invention is directed to a method of removing ammonia from fly ash by reaction with water. Surprisingly, it has been found that relatively small amounts of water are effective, if not superior, for the removal of ammonia from fly ash. This discovery facilitates the method of the present invention, which has an advantage over prior methods of removing ammonia from fly ash involving water because the use of lower volumes of water increases the rate at which the ammonia evolves from the solution. The method of the invention is also advantageous because the fly ash produced by the method more easily complies with ASTM limitations on the water content for fly ash to be used in concrete, and therefore avoids the need for drying stages in the method.

Furthermore, it has been discovered that the rate of reaction and subsequent evolution of ammonia may be enhanced by using surprisingly small amounts of alkali sources. This discovery facilitates the method of the present invention having an advantage over prior methods of removing ammonia from fly ash using larger amounts of alkali, because the presence of too much alkali reduces the utility of fly ash as an ingredient for concrete. Additionally, it has been found that the method of the present invention may be performed at normal ambient to moderate temperatures, facilitating the method of the present invention having reduced energy costs over prior processes involving elevated temperatures. Finally, it has been discovered that the method of the invention may be carried out continuously with relatively short residence times, creating a substantial reduction in reactor volumes and associated costs.

Accordingly, the present invention provides for a method for removing ammonia from fly ash, comprising adding less than 20 wt. % of water to the original mass of the fly ash, to form wetted ash, and reacting and agitating the wetted ash at a temperature below 100° C., to produce treated fly ash and ammonia containing gas.

The present invention also provides for a method for removing ammonia from fly ash, comprising adding less than 20 wt. % of water to the original mass of the fly ash to form wetted ash, and reacting and agitating the wetted ash at a ply below 12, to produce treated fly ash and ammonia containing gas.

The present invention also provides for a method for removing ammonia from fly ash, comprising adding less than 20 wt. % of water to the original mass of the fly ash to form wetted ash, and reacting the wetted ash for less than ½ hour, to produce treated fly ash and ammonia containing gas.

The present invention also provides for a method for removing ammonia from fly ash, comprising adding less than 5 wt. % of an alkali source and less than 20 wt. % of water to the original mass of the fly ash to form wetted ash, and reacting the wetted ash to produce treated fly ash and ammonia containing gas.

The present invention also provides for a method for removing ammonia from fly ash, comprising adding less than 10 wt. % of an alkali source and less than 20 wt. % of water to the original mass of the fly ash to form wetted ash, and reacting the wetted ash at a temperature below 100° C., to produce treated fly ash and ammonia containing gas.

The present invention also provides for a method for removing ammonia from fly ash, comprising adding less than 2 weight % of water to the original mass of the fly ash to form wetted ash, and reacting the wetted ash to produce treated fly ash and ammonia containing gas.

BRIEF DESCRIPTION OF THE DRAWINGS

The present invention will be better understood and its advantages more apparent in view of the following detailed description, especially when read with reference to the appended drawings, wherein.

DETAILED DESCRIPTION OF THE INVENTION

Figure 1:
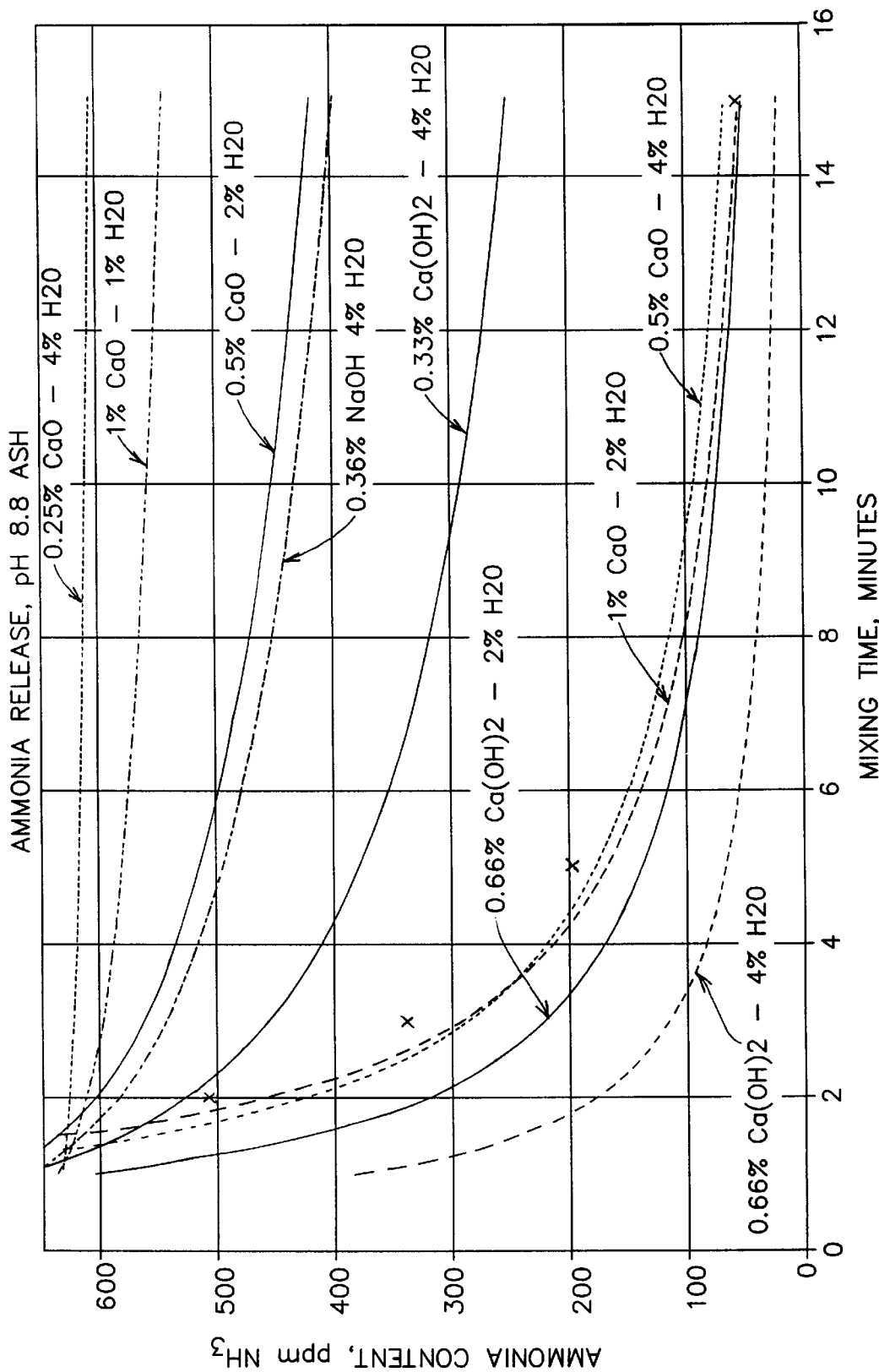
FIG. 1 is a graphic representation of Example 1 of a method of removing ammonia from fly ash, of the invention.

Disclosed herein is a method of removing ammonia from fly ash by reacting the fly ash with relatively small amounts of water. It is to be understood that the phrases "remove ammonia" and "removing ammonia" mean the removal of both ammonia and ammonium salts present in ammonia contaminated fly ash. Preferably less than 20 wt. % and more preferably less than 5 wt % of water to the original mass of fly ash is used in the method and apparatus of the invention. The rate of reaction and subsequent evolution of ammonia may be enhanced by using small amounts of alkali sources. Preferably less than 10 wt. %, more preferably less than 5 wt. %, and most preferably 0.25 to 1 wt. % of alkali to the original mass of fly ash is used. Quicklime (CaO) and hydrated lime (Ca(OH)$_2$) are two examples of such alkali sources which substantially aid in the evolution rate of ammonia from fly ash. Preferably, alkali is added with vigorous mixing to create an intimate mixture of alkali and fly ash. Water may be added simultaneously or in a subsequent step and vigorous mixing may again be applied to aid uniform distribution of the water. The method of the invention may be performed at normal ambient to moderate temperatures, preferably between 32 and 212° F. and more preferably between 60 and 150° F. Furthermore, the method may be carried out continuously with relatively short residence times. Preferably the residence time is less than ½ hour, and more preferably it is less than 15 minutes.

The chemical processes which result in the release of ammonia as a gas from ammonia contaminated fly ash, as well as that by which this release occurs in the preparation of concrete, utilize the fundamental chemistry of ammonia. Ammonia is an alkaline gas and forms ammonium salts with acid gases. Liberation of ammonia from fly ash requires that the salt anions, usually sulfate, be tied up with another alkali. Any strong alkali will serve with the cheapest source of alkali being lime (CaO). The reaction of ammonium salts with lime while liberating ammonia is strongly favored by chemical equilibrium. The chemical reaction occurs rapidly once the compounds are dissolved.

The overall reaction can be expressed as:

$$(NH_4)_2SO_{4(s)} + CaO_{(s)} \rightarrow 2NH_{3(g)} + CaSO_{4(s)} + H_2O_{(g)}$$

The vapor pressures of the solids are quite low and the reaction cannot occur in the gas phase. However, ammonium sulfate is highly soluble in water and dissociates to ammonium ions and sulfate ions.

$$(NH_4)_2SO_{4(aq)} \rightarrow 2NH_4^+{}_{(aq)} + SO_4^{2-}{}_{(aq)}$$

Lime is highly unstable on exposure to water, favoring a highly exothermic reaction producing calcium hydroxide or hydrated lime.

$$CaO_s + H_2O \rightarrow Ca(OH)_{2(s)}$$

The hydrated lime is only sparingly soluble in water, producing calcium and hydroxide ions.

$$Ca(OH)_{2(s)} \rightarrow \leftarrow Ca^{2+}{}_{(aq)} + 2OH^-{}_{(aq)}$$

Calcium sulfate is also sparingly soluble, so that as calcium ions are made available by dissolving the hydrated lime, they tend to be consumed by precipitation of calcium sulfate.

$$Ca^{2+}{}_{(aq)} + SO_4^{2-}{}_{(aq)} \rightarrow \leftarrow CaSO_{4(s)}$$

Finally, an equilibrium exists between ammonium ions and ammonia dissolved in water.

$$NH_4^+{}_{(aq)} + OH^-{}_{(aq)} \rightarrow \leftarrow NH_{3(aq)} + H_2O$$

The degree to which the ammonium ion is converted to ammonia is dependent on the pH of the aqueous system, higher pH's favoring the formation of ammonia. This equilibrium is well known and found in many handbooks such as *Perry's Chemical Engineers' Handbook*. Knowledge of this equilibrium is also widely used in chemical analysis procedures where ammonium salts are converted into dissolved ammonia in water with subsequent analysis of the total amount of ammonia present.

When water is added to ammonia contaminated fly ash according to the method of the invention, a water film formed on the surface of the fly ash particles to enable dissolution of ammonium salts and migration and reaction of ions, resulting in the conversion of ammonium ion to dissolved ammonia gas. Due to the high relative vapor pressure of ammonia to water, the ammonia evolves from the remaining water film and may be removed.

Preferably the pH of the water film is greater than 10. If the pH resulting from applying only water to the ash satisfies this pH, no further source of alkalinity is desired. If the solution pH of the fly ash alone is not greater than 10, it may be adjusted by the addition of alkali sources such as quicklime or hydrated lime.

Due to the vapor pressure of dissolved ammonia, ammonia will evolve from the fly ash/water/alkali mixture at ambient conditions. This means that the use of larger amounts of water, such as that disclosed in the related art, will result in lower evolution rates because of the lower concentration of ammonia, while the use of smaller amounts of water will improve ammonia evolution. Passing air or other dry gas over an agitated bed of the mixture will aid mass transport of ammonia from the bulk of the mixture. Heating or degassing the ash under vacuum will also enhance the rate at which the ammonia is removed. However, no heat or vacuum is required to reduce the ammonia content of the fly ash to acceptable levels.

The rate at which the ammonia is removed from the fly ash is dependent not only on the vapor pressure of the resulting water/NH$_3$ solution, but also on the rate of conversion of the ammonium ion to ammonia. This conversion rate in turn is controlled by the rates of dissolution of the ammonium salts, dissolution and hydration of the lime, subsequent migration of the calcium and sulfate ions, and precipitation rate of the calcium sulfate formed. Precipitation of calcium sulfate species decreases the momentary concentration of calcium in solution, enabling further lime to be dissolved, providing additional reagent for reaction of ammonium salts.

The solubility of the ammonium salts is very high compared to the calcium species, so that the dissolution and equilibria involving the calcium species are the dominant controlling factors in the process. Furthermore, the solution volume, which is the total volume of water solution in contact with the solid particles, affects both the amount of calcium ions present and the mobility of the ions from the calcium-containing solid particles. The solution volume will control the amount of calcium immediately available for reaction due to the limited solubility of CaO or $Ca(OH)_2$. Too little solution may also provide an incomplete surface film of solution on all particles, or a very thin film which will limit the transport of ions though the solution volume. Increasing the solution volume will increase the overall rate of reaction. Increasing the amount of calcium will also increase the rate by reducing the ion migration distances required. Also, decreasing the particle size of the calcium source will also increase the rate due to ion migration.

The chemical reactions of the method of the invention may be carried out in mixing equipment used to mix water and ammonia contaminated fly ash. Because the overall rate of ammonia liberation depends on the intrinsic reaction kinetics, the ionic transport rates through the water film, the particle size and dispersion of the alkali source through the fly ash, and the rate of vaporization of dissolved ammonia from the liquid film, the required residence time in the mixing equipment will depend on the intensity of mixing.

Figure 4:
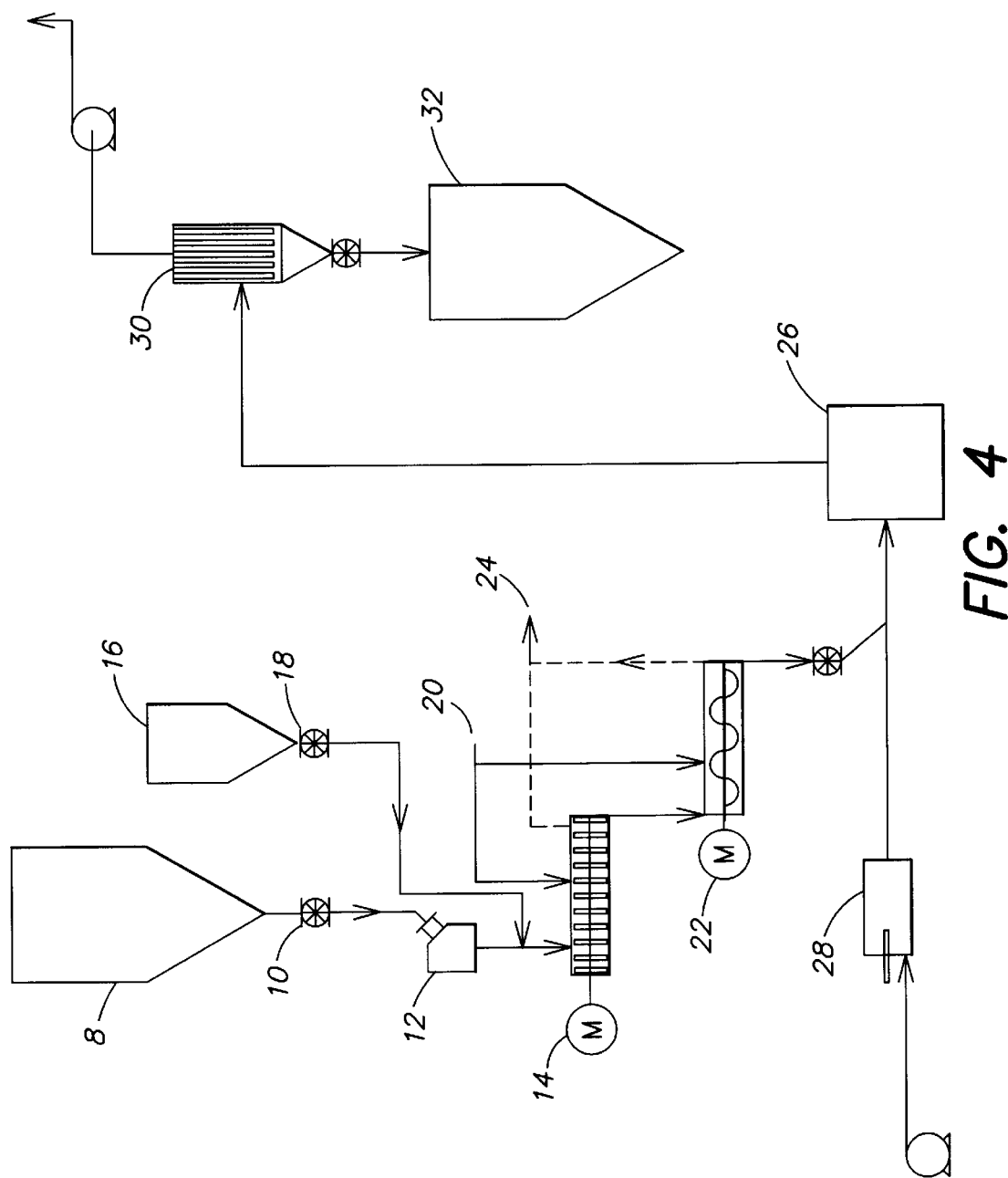
FIG. 4 is a schematic diagram of one embodiment of an apparatus to practice the method of the invention.

Preferably, the method of the present invention is carried out continuously, for example as shown in the apparatus illustrated in FIG. 4. Fly ash may be first collected, for example, in a fly ash storage vessel 8 and continuously metered at a controlled rate into mixing equipment 14, 22, using a rotary feeder with variable speed control 10 and a solids flowmeter 12. A steady flow of ash into the mixing equipment is preferable to ensure a consistent mix.

Dry fly ash and alkali source from a storage vessel 16 may then be mixed in a dry state using a high-intensity continuous mixer 14. Alkali source may be added directly to the fly ash in proportion to the fly ash flow rate just prior to the mixer inlet using a screw-type feeder 18. Water from a water supply 20 may be added in a subsequent mixing step or added together with the alkali source in a single mixing step in high intensity mixer 14.

Under some conditions, the overall reaction occurs rapidly and may be essentially complete in the residence time of mixer 14. For other conditions, the overall reaction rate is slower so that the ammonia liberation reaction is not complete in the mixer residence time. For these conditions, a subsequent low-intensity mixing device 22 such as a pugmill or screw conveyor with holdup time sufficient to remove ammonia to the desired level may be used.

After the ammonia liberating reaction is completed, the ammonia off-gas may be vented from mixing equipment 14, 22 to ammonia collection/recovery area 24. The gases may be collected and recovered by either recycling back to the power station boiler flue(s), or scrubbing with water for ammonia disposal.

The moist fly ash stream may be dried, preferably to less than 0.5% residual moisture. preferably using a flash or pneumatic-conveyor dryer 26 and a gas fired burner or electric heater 28 to heat the air. The dried ash may be collected in a pneumatic conveyor receiver 30 and then placed in a storage vessel 32 until sold or used.

The following examples demonstrate various embodiments of the method of this invention. They are included as illustrations of specific embodiments of the invention and should not be construed to limit the scope of the claims.

EXAMPLE 1

A coal combustion fly ash with a natural pH of 8.8 and an initial ammonia content of 650 ppm was treated to remove ammonia with a variety of combinations of quicklime, hydrated lime, sodium hydroxide, and water at ambient temperature. The alkali source was intimately mixed with the fly ash by vigorous agitation prior to addition of the water, except for the experiment using NaOH, which was added as a water solution. The results are presented in FIG. 1 and summarized in Table 1.

TABLE 1

| Alkali Added | Water Added | Time to reach $\leq$100 ppm $NH_3$ |
|---|---|---|
| 0.25% CaO | 4% | >>15 minutes |
| 0.5% CaO | 4% | 10 minutes |
| 0.5% CaO | 2% | >15 minutes |
| 1% CaO | 2% | 8 minutes |
| 1% CaO | 1% | >>15 minutes |
| 0.36% NaOH | 4% | >15 minutes |
| 0.33% $Ca(OH)_2$ | 4% | >15 minutes |
| 0.66% $Ca(OH)_2$ | 2% | 8 minutes |
| 0.66% $Ca(OH)_2$ | 4% | 4 minutes |

Addition of a small amount of CaO (0.25%) and water (4%) is ineffective for removing the ammonia during a 15 minute mixing period. However, increasing the CaO addition to 0.5% reduces the ammonia content of the fly ash from 650 ppm to <100 ppm within 10 minutes of mixing. Increasing either the quantity of CaO or water improves the rate of ammonia release. However minimum quantities of both additives must be present: when 0.25% CaO with 4% water, or 1% CaO with 1% water are used, minimal ammonia is released during a 15 minute mixing period.

Addition rates of hydrated lime ($Ca(OH)_2$) were chosen to provide the equivalent amount of calcium to the system as the additional rates of CaO. Thus, 0.25% CaO provides the equivalent amount of calcium as 0.33% $Ca(OH)_2$, and 0.5% CaO$\equiv$0.66% $Ca(OH)_2$. When using $Ca(OH)_2$, removal of ammonia is more rapid than when equivalent amounts of CaO and water are used. Hydrated lime thus enhances the overall rate of ammonia removal. Since the CaO must first react with water present to form $Ca(OH)_2$, commonly called slaking, delays associated with this reaction as well as consumption of water by the reaction retards the subsequent conversion of ammonium salts to dissolved ammonia and final evolution of ammonia from the system. Since it is preferable to use as little alkali and water as possible to remove ammonia from the ash, the hydrated lime is the preferred reagent for the process.

Sodium hydroxide (NaOH) is an alternative alkaline material to calcareous alkali. Furthermore, sodium hydroxide is highly soluble in water, unlike either quicklime or hydrated lime. However, using a stoichiometric amount of NaOH equivalent to 0.25% CaO or 0.33% $Ca(OH)_2$, ammonia removal using NaOH is less effective than with hydrated lime. Due to the extremely high pH of the NaOH solution (>14), the ash particles agglomerate in the presence of the NaOH solution, reducing the mixing efficiency and transport of necessary ions for reaction. Furthermore, even if NaOH was an efficient reagent for removing ammonia, the resulting levels of available sodium in the fly ash would render it unsuitable for use in concrete.

EXAMPLE 2

Figure 2:
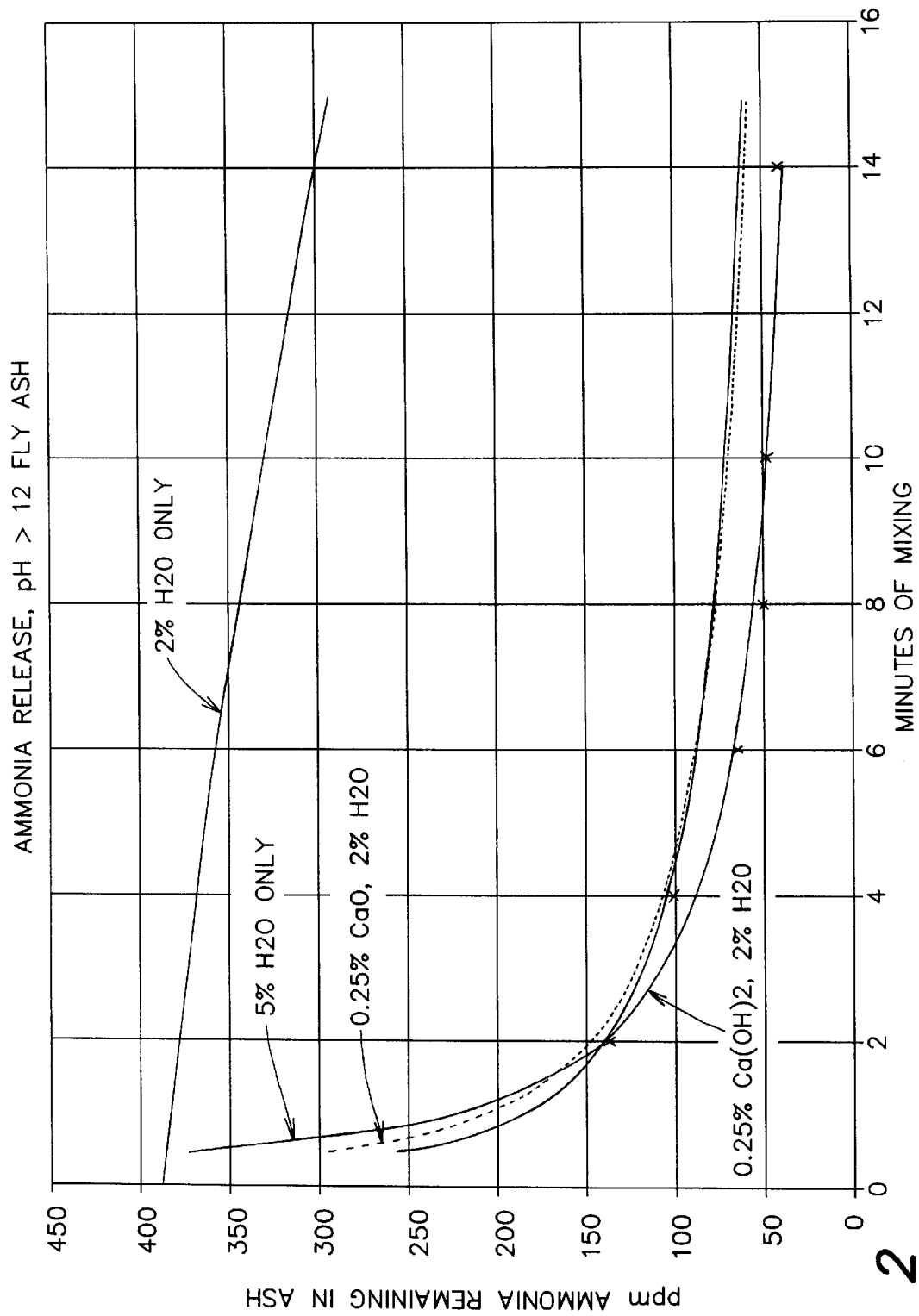
FIG. 2 is a graphic representation of Example 2 of the method of the invention.

A coal combustion fly ash with a natural pH of greater than 12 and an initial ammonia content of 400 ppm was treated to remove ammonia with quicklime, hydrated lime, and water at ambient temperature. The results are presented in FIG. 2. Due to the very high natural pH of this ash, a sufficient amount of water (5%) is very effective in solubilizing the ammonium salts and available alkali, producing a high pH solution of ammonia, which evolves due to the high vapor pressure of ammonia. However, a lower amount of water (2%) is much less effective. The addition of small amounts of either quicklime or hydrated lime premixed with the fly ash is highly effective, inducing removal of ammonia with the addition of only 2% water.

EXAMPLE 3

Figure 3:
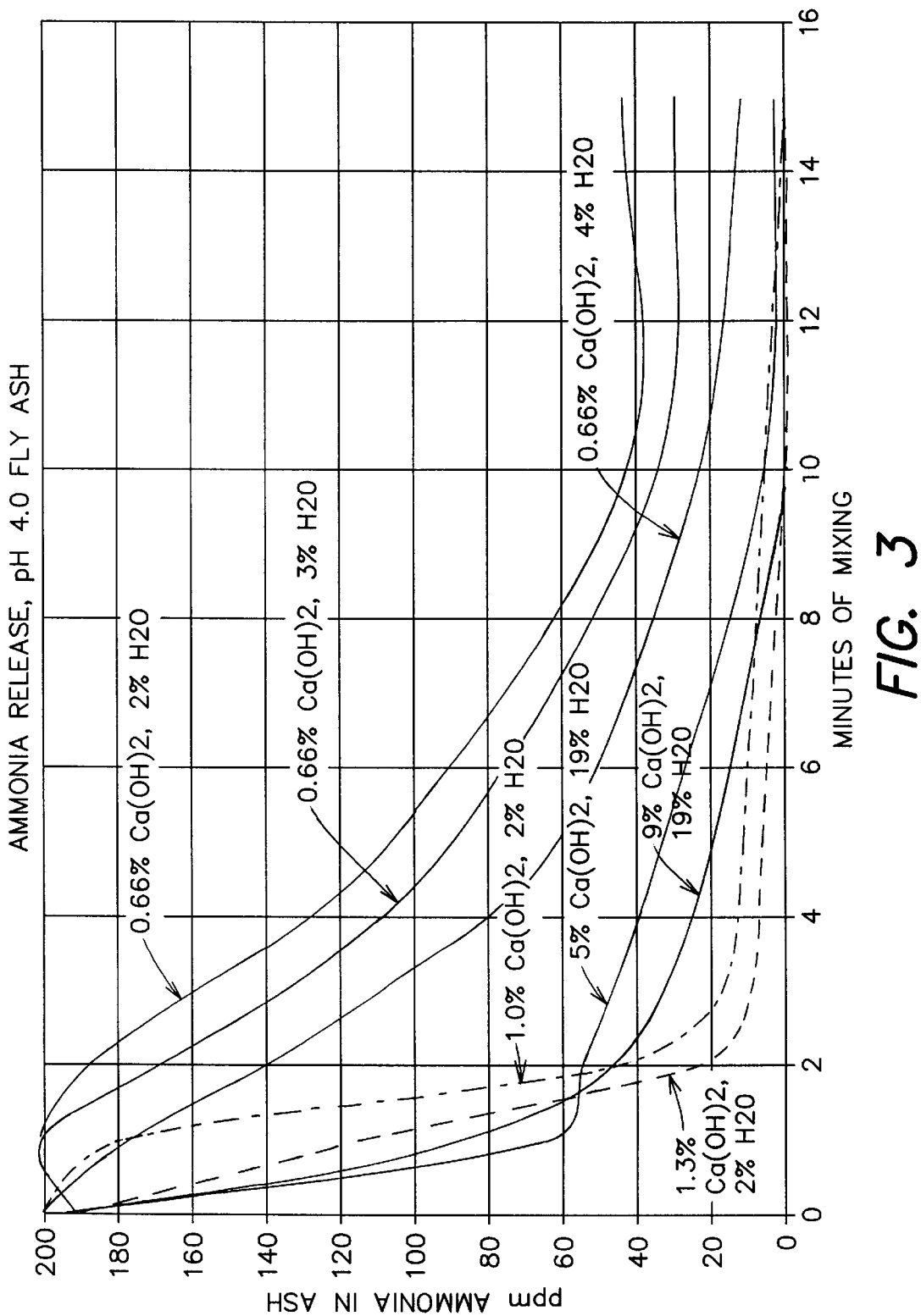
FIG. 3 is a graphic representation of Example 3 of the method of the invention.

A coal combustion fly ash with a natural pH of 4.0 and an initial ammonia content of 200 ppm was treated to remove ammonia with hydrated lime and water. The results are presented in FIG. 3. A process formulation of 0.66% $Ca(OH)_2$ and 2% $H_2O$ was sufficient to reduce the ammonia content of the ash to less than 100 ppm with 5.5 minutes of mixing. However, using 0.66% $Ca(OH)_2$ and 4% $H_2O$ did not accelerate the rate of ammonia removal by as large a factor as in example #2 with a pH 8.8 fly ash. Due to the acidity of this fly ash, a greater proportion of the added alkali is consumed in adjusting the system pH with less alkali available to drive the conversion of ammonium sulfate to calcium sulfate and dissolved ammonia. Using greater quantities of alkali while maintaining the water addition rate at 2% greatly accelerates the reaction, with reductions of ammonia to 100 ppm after approximately one minute of mixing, and reduction to less than 40 ppm ammonia at two minutes. Since the ammonia is more difficult to remove from this particular low pH ash as compared to higher pH ashes presented in the previous examples, the use of very high quantities of lime and water were investigated. As presented in FIG. 3, the use of up to 9% calcium hydroxide and 19% water is effective in removing the ammonia, though these conditions actually require longer mixing times than lower amounts of water. This is because the resulting lower concentration of ammonia in the excess water decreases the evolution rate of ammonia.

EXAMPLE 4

A coal combustion fly ash was added continuously with $Ca(OH)_2$ and water to a high-intensity mixing device (Turbulizer Model TCJS-8) and then subsequently fed to a low-intensity mixing device (Thermascrew Model TJ-8). The amount of fly ash, $Ca(OH)_2$ and water used, the speed of the high-intensity mixer, and the ammonia concentration before and after each stage is reported in Table II.

TABLE 2

Continuous Testing Results.

| Run | Fly Ash lb./hr | $Ca(OH)_2$ lb./hr | Water lb./hr | Turbulizer RPM | Initial ppm $NH_3$ | Turbulizer ppm $NH_3$ | Screw ppm $NH_3$ |
|---|---|---|---|---|---|---|---|
| 1 | 500 | 10 | 37 | 3000 | 240 | 60 | 40 |
| 2 | 500 | 10 | 20 | 3000 | 240 | 160 | 40 |
| 3 | 500 | 10 | 20 | 1500 | 240 | 200 | 50 |

It will be understood that each of the elements described herein, or two or more together, may be modified or may also find utility in other applications differing from those described above. While particular embodiments of the invention have been illustrated and described, it is not intended to be limited to the details shown, since various modifications and substitutions may be made without departing in any way from the spirit of the present invention as defined by the following claims.

What is claimed is:

1. A method for removing ammonia from fly ash, comprising the steps of:
   adding less than 20 wt. % of water to an original mass of the fly ash, to form a wetted ash; and
   reacting and agitating the wetted ash at a temperature below 100° C., to produce a treated fly ash and an ammonia containing gas.

2. A method for removing ammonia from fly ash, comprising the steps of:
   adding less than 20 wt. % of water to an original mass of the fly ash, to form a wetted ash; and
   reacting and agitating the wetted ash at a pH below 12, to produce a treated fly ash and an ammonia containing gas.

3. A method for removing ammonia from fly ash, comprising the steps of:
   adding less than 20 wt. % of water to an original mass of the fly ash, to form a wetted ash; and
   reacting the wetted ash for less than ½ hour, to produce a treated fly ash and an ammonia containing gas.

4. A method for removing ammonia from fly ash, comprising the steps of:
   adding less than 5 wt. % of an alkali source to an original mass of the fly ash;
   adding less than 20 wt. % of water to an original mass of the fly ash, to form a wetted ash; and
   reacting the wetted ash to produce a treated fly ash and an ammonia containing gas.

5. A method for removing ammonia from fly ash, comprising the steps of:
   adding less than 10 wt. % of an alkali source to an original mass of the fly ash;
   adding less than 20 wt. % of water to the original mass of the fly ash, to form a wetted ash; and
   reacting the wetted ash at a temperature below 100° C., to produce a treated fly ash and an ammonia containing gas.

6. A method for removing ammonia from fly ash, comprising the steps of:
   adding less than 2 weight % of water to an original mass of the fly ash, to form a wetted ash; and
   reacting the wetted ash to produce a treated fly ash and an ammonia containing gas.

7. The method of claim 1, 2, 3, 4, 5 or 6 where the wetted ash has a pH greater than 10.

8. The method of claim 1, 2, 3 or 6 further comprising the additional step of:
   adding an alkali source to the fly ash.

9. The method of claim 4 or 5, wherein the alkali source is chosen from one or more of quicklime, hydrated lime caustic, lime slurry, caustic solution, partially hydrated lime, partially calcined lime and fluid bed residue.

10. The method of claim 8, wherein the alkali source is chosen from one or more of quicklime, hydrated lime caustic, lime slurry, caustic solution, partially hydrated lime, partially calcined lime and fluid bed residue.

11. The method of claim 1, 2, 3, 4, 5 or 6, further comprising the step of enhancing the ammonia removal by heating and drying of the mixture.

12. The method of claim 1, 2, 3, 4, 5 or 6, comprising the additional step of:
   recovering ammonia from the ammonia containing gas.

13. The method of claim 12, further comprising the step of injecting the ammonia into a flue gas before a precipitator or bag house of a coal fired combustion system in order to achieve one of NOx emission reduction, acid gas emission reduction, improved precipitator performance, reduced opacity of the stack gases, and reduced particle emissions.

14. The method of claim 12, where the recovered ammonia is used to produce a nitrogen containing fertilizer.

15. The method of claim 1,2 3, 4, 5 or 6, further comprising the step of processing the fly ash to remove carbon.

16. The method of claim 1, 2, 3, 4, 5 or 6, further comprising the additional step of:
   adding the treated fly ash as a pozzolanic additive to concrete.

17. The method of claim 1, 2, 3, 4, 5 or 6, further comprising the step of adding the recovered fly ash as a material additive as any of a structural fill additive, a flowable fill additive, a soil stabilizing additive, a raw material to make lightweight aggregate, an additive to asphalt, a fill for plastic, and a fine aggregate for concrete.

* * * * *